United States Patent
Kamenetz et al.

(10) Patent No.: US 9,483,032 B2
(45) Date of Patent: Nov. 1, 2016

(54) MULTI-CHANNEL PROTECTION LOGIC

(75) Inventors: Jeffry K. Kamenetz, Windsor, CT (US); Mark A. Johnston, Windsor, CT (US); Edward John Marotta, Longmeadow, MA (US); John M. O'Neil, Litchfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1441 days.

(21) Appl. No.: 13/239,708

(22) Filed: Sep. 22, 2011

(65) Prior Publication Data

US 2013/0079894 A1    Mar. 28, 2013

(51) Int. Cl.
| | |
|---|---|
| *G05B 9/03* | (2006.01) |
| *G01R 19/25* | (2006.01) |
| *G06F 19/00* | (2011.01) |
| *F02D 41/22* | (2006.01) |
| *F02D 41/26* | (2006.01) |
| *F02D 41/28* | (2006.01) |
| *F01D 21/02* | (2006.01) |
| *F02C 9/46* | (2006.01) |

(52) U.S. Cl.
CPC .................. *G05B 9/03* (2013.01); *F01D 21/02* (2013.01); *F02C 9/46* (2013.01); *F02D 41/22* (2013.01); *F02D 41/266* (2013.01); *F02D 41/28* (2013.01); *F02D 2200/101* (2013.01); *F02D 2400/08* (2013.01); *F05D 2270/021* (2013.01)

(58) Field of Classification Search
CPC ...... F02D 41/22; F02D 41/266; F02D 41/28; F02D 2200/101; F02D 2400/08; F01D 21/02; G05B 9/03; F02C 9/46; F05D 2270/021

USPC .................................................. 361/51; 700/4
See application file for complete search history.

(56) References Cited

U.S. PATENT DOCUMENTS

| | | |
|---|---|---|
| 3,978,659 A | 9/1976 | Smith et al. |
| 4,029,952 A | 6/1977 | Giras et al. |
| 4,521,871 A | 6/1985 | Galdun et al. |
| 4,562,528 A | 12/1985 | Baba |
| 4,797,884 A | 1/1989 | Yalowitz et al. |
| 4,890,284 A | 12/1989 | Murphy et al. |
| 4,937,777 A | 6/1990 | Flood et al. |
| 5,128,943 A | 7/1992 | Tulpule et al. |
| 5,192,873 A | 3/1993 | Wrenbeck et al. |
| 5,274,554 A | 12/1993 | Takats et al. |
| 5,279,107 A | 1/1994 | Meisner et al. |
| 2004/0117102 A1 | 6/2004 | Weir et al. |
| 2011/0087343 A1 | 4/2011 | Kamenetz et al. |

FOREIGN PATENT DOCUMENTS

DE    102007032827    1/2009

OTHER PUBLICATIONS

European Search Report dated Jan. 11, 2013 for European Patent Application No. 12184056.5.

*Primary Examiner* — Zeev V Kitov
*Assistant Examiner* — Kevin J Comber
(74) *Attorney, Agent, or Firm* — Carlson, Gaskey & Olds, P.C.

(57) ABSTRACT

A multi-channel controller uses multiple logic gates and multiple control channels to provide fault tolerant protection against undesired events.

10 Claims, 7 Drawing Sheets

FIG.7 ions, the following of which is a brief description.
MULTI-CHANNEL PROTECTION LOGIC

TECHNICAL FIELD

The present disclosure relates to multi-channel controls, and particularly to multi-channel protection logic.

BACKGROUND OF THE INVENTION

Many control systems have independent protection devices. For example. engine control systems, and particularly multi-channel engine control systems, include overspeed detection systems that detect the occurrence of an overspeed within an engine and trigger an action in response to detecting an overspeed to mitigate the overspeed condition.

Protection systems often include redundancy, such that no single point failure in the protection system causes the plant to be unable to protect against an event. Furthermore, protection systems are also designed such that no single point failure inadvertently shuts down the plant. Typically plant control systems use two dedicated plant control-function independent hardware overspeed devices to detect and respond to overspeed conditions. These systems can fail to protect against overspeed if one of the two protection devices fails.

In other systems that use a primary control to supplement the protection devices, the protection devices are hardware devices that lack flexibility in self-testing or in changing the implementation. Furthermore, the prior art shared a microprocessor bus between the primary controller and the protection device.

SUMMARY OF THE INVENTION

A multi-channel controller has a first control channel having a first primary controller with a first protection output signal and a first protection device with a first protection output signal. A second control channel has a second primary controller with a second protection output signal and a second protection device with a second protection output signal. A plurality of logic gates connect each of the first primary control output signal, the first protection device output signal, the second primary control output signal, and the second protection device output signal to a controlled device.

A method for controlling a multi-channel solenoid includes the steps of detecting an event using at least one of a first protection device, and a second protection device, outputting an event detected signal from each of the first protection device, and the second protection device detecting the event, and activating at least one channel of a multi-channel solenoid.

Also disclosed is a method for controlling a multi-channel solenoid by monitoring the current through an overspeed solenoid, and thereby determining the health of a controller and the health of multiple logic gates using a protection device.

These and other features of the present invention can be best understood from the following specification and drawings, the following of which is a brief description.

DETAILED DESCRIPTION

Figure 1:
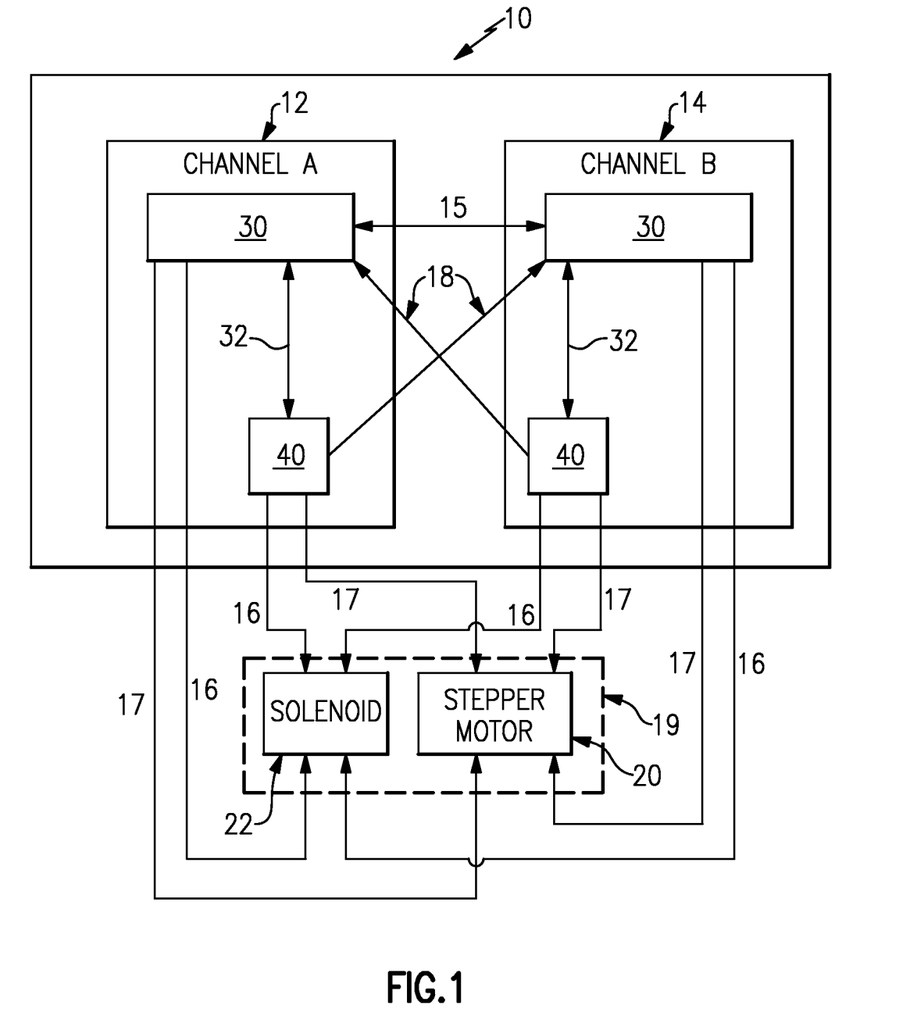
FIG. 1 illustrates a multi-channel engine controller controlling a stepper motor that adjusts engine fuel flow.

FIG. 1 illustrates an example electronic multi-channel engine controller 10, controlling a stepper motor 20 within a hydromechanical metering unit 19. The solenoid 22 actuates an overspeed shutoff valve to an engine (not pictured) that reduces or eliminates fuel supply to the engine when a certain condition exceeds a threshold. In the illustrated example, the condition is an engine speed, and the system is referred to as an overspeed protection system. However, it is understood that a similar system could protect against excessive temperature, or other conditions, and fall within the below disclosure.

The multi-channel controller 10 includes two channels 12, 14 each of which includes a primary controller 30 that controls the engine while the primary controller 30 is healthy (fully functioning). Furthermore, each channel 12, 14 includes a microprocessor protection device 40 that includes a backup controller function that assumes control if the primary controller 30 becomes unhealthy. The protection device 40 also provides an overspeed protection control independent of the primary controller 30. Specifically an overspeed solenoid 22 is activated and shuts off or reduces fuel to the engine when an overspeed condition is detected, thereby eliminating the overspeed condition. When the overspeed condition ends, the overspeed solenoid 22 is deactivated and allows fuel to reach the engine. The illustrated overspeed solenoid 22 is a two coil or two channel solenoid, and either coil activating is sufficient to reduce or eliminate fuel flow to the engine.

Between the two primary channels is a cross-channel data link 15 that provides data communications between channels 12, 14. Each channel 12, 14 includes an overspeed detection output signal 16 from the corresponding primary controller 30 and the protection device 40 corresponding to the overspeed protection solenoid 22. Also, each channel 12, 14 has a stepper motor output signal 17 from the primary controller 30 and the protection device 40 corresponding to the stepper motor 20 within the hydromechanical metering unit 19. A cross-channel overspeed vote signal 18 communicates between one channel's 12, 14 protection device 40 and the other channel's 12, 14 primary controller 30.

Figure 2:
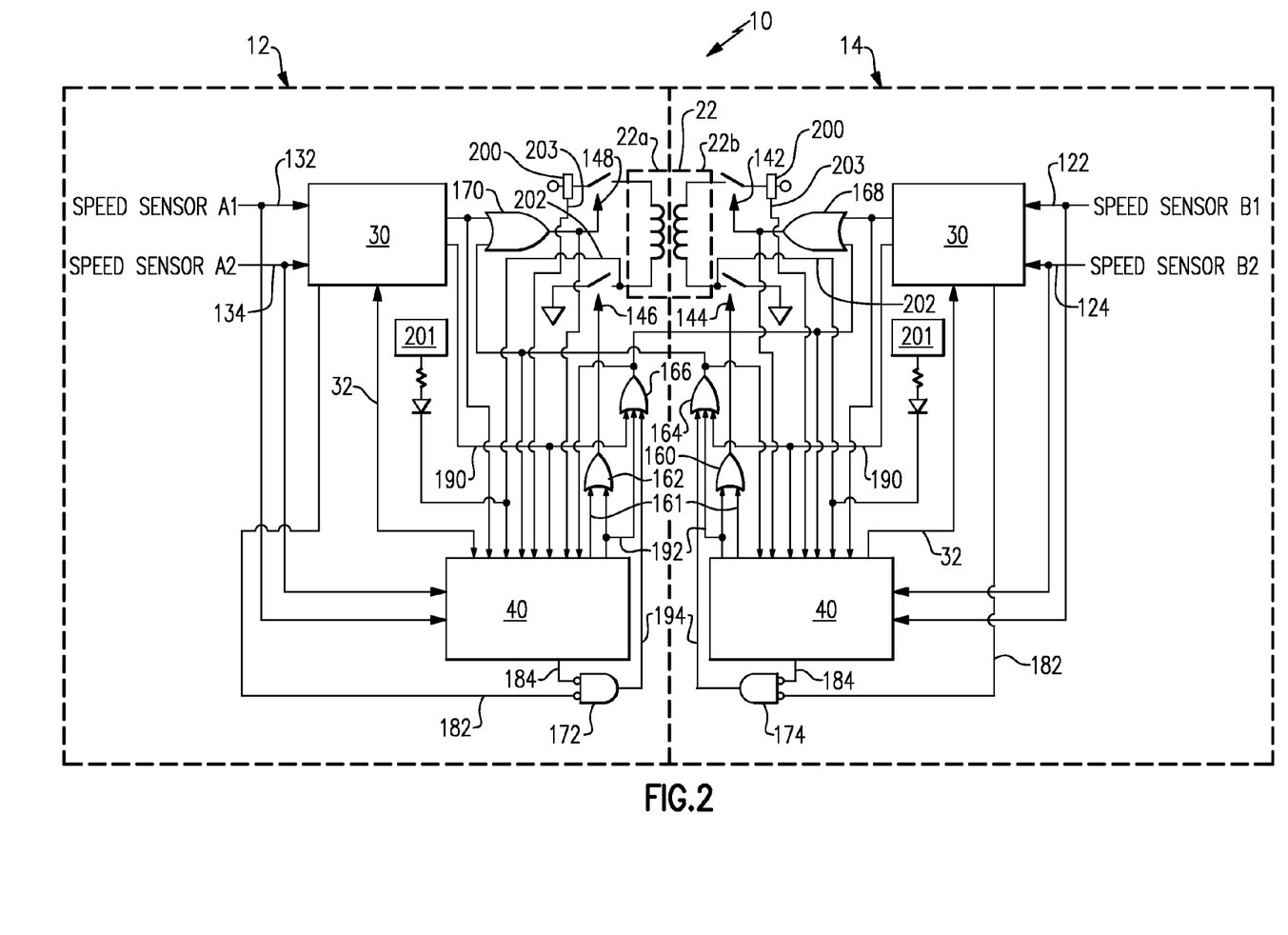
FIG. 2 illustrates an example logical configuration for connecting the multi-channel controller of FIG. 1 to an overspeed protection solenoid.

FIG. 2 illustrates an example logical configuration for connecting the multi-channel controller 10 of FIG. 1 to the overspeed solenoid 22 while allowing continued overspeed protection in a number of failure modes. Each channel 12, 14 of FIG. 1 has a pair of corresponding sensor inputs 122, 124, 132, 134. Two sensor inputs 122, 124 are accepted by both controllers 30, 40 in channel 14 and the other sensor inputs 132, 134 are accepted by both controllers 30, 40 in channel 12. The overspeed solenoid 22 has two channels 22a, 22b, each of which has two inputs 142, 144, 146, 148. When each of the two inputs 142, 144, 146, 148 corresponding to a single channel 22a, 22b of the overspeed solenoid 22 instructs the overspeed solenoid 22 to restrict fuel to the engine, the overspeed solenoid 22 activates and restricts fuel flow.

Also included in the configuration of FIG. 2 are multiple logic gates 160-174. The logic gates 160-174 combine the outputs of the controllers 30, 40 thereby ensuring that no single controller 30, 40 failure causes the overspeed detection system to fail. The logic gates 160-174 are implemented using solid state digital logic circuits. Primary OR gates 168, 170 each accept one input from a corresponding primary controller 30 and one input from an alternate OR gate 164, 166 (alternately referred to as the cross-channel Overspeed Vote Signal) and output an "activate overspeed solenoid" signal whenever the corresponding primary controller 30 or the alternate OR gate 164, 166 indicates an overspeed condition. The overspeed solenoid 22 accepts the output of the primary OR gate 168, 170 at each of the primary control inputs 142, 148.

Each of the alternate OR gates 164, 166 has three inputs 190, 192, 194. The first alternate OR gate input 190 is an overspeed detection output of the primary controller 30 in the same channel 12, 14 as the alternate OR gate 164, 166 and is high whenever the primary controller 30 detects an overspeed. The second alternate OR gate input 192 is an overspeed detection output signal from the protection device 40 of the same channel 12, 14 as the alternate OR gate 164, 166 and is high whenever an overspeed is detected by the corresponding protection device 40. The third alternate OR gate input 194 is an output of a channel health control AND gate 172, 174 in the same channel 12, 14 as the alternate OR gate 164, 166.

Each of the channel health control AND gates 172, 174 accepts and inverts a primary controller health input 182 and a protection device health input 184, with each of the inputs being high when the corresponding controller 30, 40 is healthy. Due to the inverting of the inputs 182, 184, the output of the channel health control AND gate 172, 174 is high only when both the protection device 40 and the primary controller 30 for the corresponding channel 12, 14 are unhealthy. Thus, when both controllers 30 and 40 within the same channel are unhealthy, the local channel protection system defaults to a failsafe state of detecting an overspeed in the remote channel.

The protection device inputs 144, 146 of the overspeed solenoid 22 are connected to the output of backup OR gates 160, 162. Backup OR gates 160, 162 accept an overspeed detected input 192 corresponding to the overspeed detection of the protection devices 40. When the protection device 40 detects an overspeed condition, the overspeed detected input 192 is high. Thus, the backup OR gates 160, 162 instruct the overspeed solenoid 22 to activate whenever the protection device 40 detects an overspeed condition.

In order to test protection device inputs 144, 146 prior to operation backup OR gates 160, 162 have inputs 161 from their respective protection devices that allows the channel 14 to activate switch 144 without activating switch 148 and the channel 12 to activate switch 146 without activating switch 142.

Since the protection device 40 is a microprocessor, it is capable of reading and intelligently reacting to self-test signals. A current sensor 200 transmits an analog signal 203 that permits the protection device 40 to monitor current through the overspeed solenoid 22 to determine the health of the protection device and the plurality of Boolean logic gates 160-170.

Optionally, it is possible output LSS signals 161 or 192 such that the LSS signals 161, 192 pulse width modulate the current command thereby creating a closed loop.

Also, the LSS voltage is monitored using signal 202. Signal 202 is pulled up to a voltage 201 that is less than the voltage required to energize the overspeed solenoid through the switch commanded by input 148. Thus, the health of the switches controlled by commands 146 and 148, and the health of the plurality of Boolean logic gates 160-170 can be determined by the protection device 40.

Furthermore, for self-test capability for determination of the health of the Boolean logic gates 160-170 by the protection device 40, the following Boolean logic gate signals are monitored by the protection device 40: switch input 148, output of the local OR gate 166 (alternately referred to as the local overspeed vote signal), output of the remote OR gate 164 (alternately referred to as the remote overspeed vote signal) and both outputs out of primary controller 30 (the input to primary OR gate 170 and the input to alternate OR gate 166). Both outputs from primary controller 30 are passively buffered to prevent faults from propagating from the primary controller 30 to the protection device 40 and the plurality of Boolean logic gates 160-170.

In order to announce the results of self-testing, protection device 40 has a data link 32 for reporting self-test results. Primary controller 30 passes the self-test results to an operator of the protected device (alternately referred to as a plant operator). Alternatively, protection device 30 can have a second data link or equivalent output (fault lamp drivers, etc) that announces faults to a plant operator.

The data link 32 is also used for coordinating special self-tests during control power-up and plant shutdown with the primary controller 30. The software is written in the protection device 40 such that the protection device's 40 normal operating protection algorithm is unchanged by any data transmissions from the primary controller 30.

During a shutdown, the overspeed system 10 can verify its own health by using either channel or both channels 12, 14 to shutdown the plant. Such a mode is referred to as a self-test mode. In the self-test mode, the primary controller 30 activates the input to primary OR gate 170 and the protection device 40 activates the self-test overspeed vote signal 161. Testing both channels ensures that the overspeed solenoid 22 is not wound incorrectly such that the magnetic field of one channel cancels the magnetic field of the other channel.

The signal from primary controller 30 to primary OR gate 170 is only used during the self-test mode to prevent a single in-range failure within the plant sensor inputs 132, 134 inadvertently activating the overspeed solenoid 22 during normal operations.

The microprocessor systems of the primary controller 30 and the protection device 40 include disable signals from independent monitors within the microprocessors. Whenever a microprocessor-based monitor detects a fault, the outputs from that microprocessor are disabled such that the microprocessor does not detect for an overspeed. The disable signals are used to generate primary controller health signal 182 and protection device health signal 184. As stated earlier, when both controllers 30 and 40 within the same channel are unhealthy, the local channel protection system defaults to a failsafe state of detecting for an overspeed in the remote channel.

Operation of the two channel 12, 14, four controller 30, 40 system is disclosed in greater detail below with regards to FIGS. 3-7, each of which describes a particular operation mode of the example configuration of FIG. 2.

Figure 3:
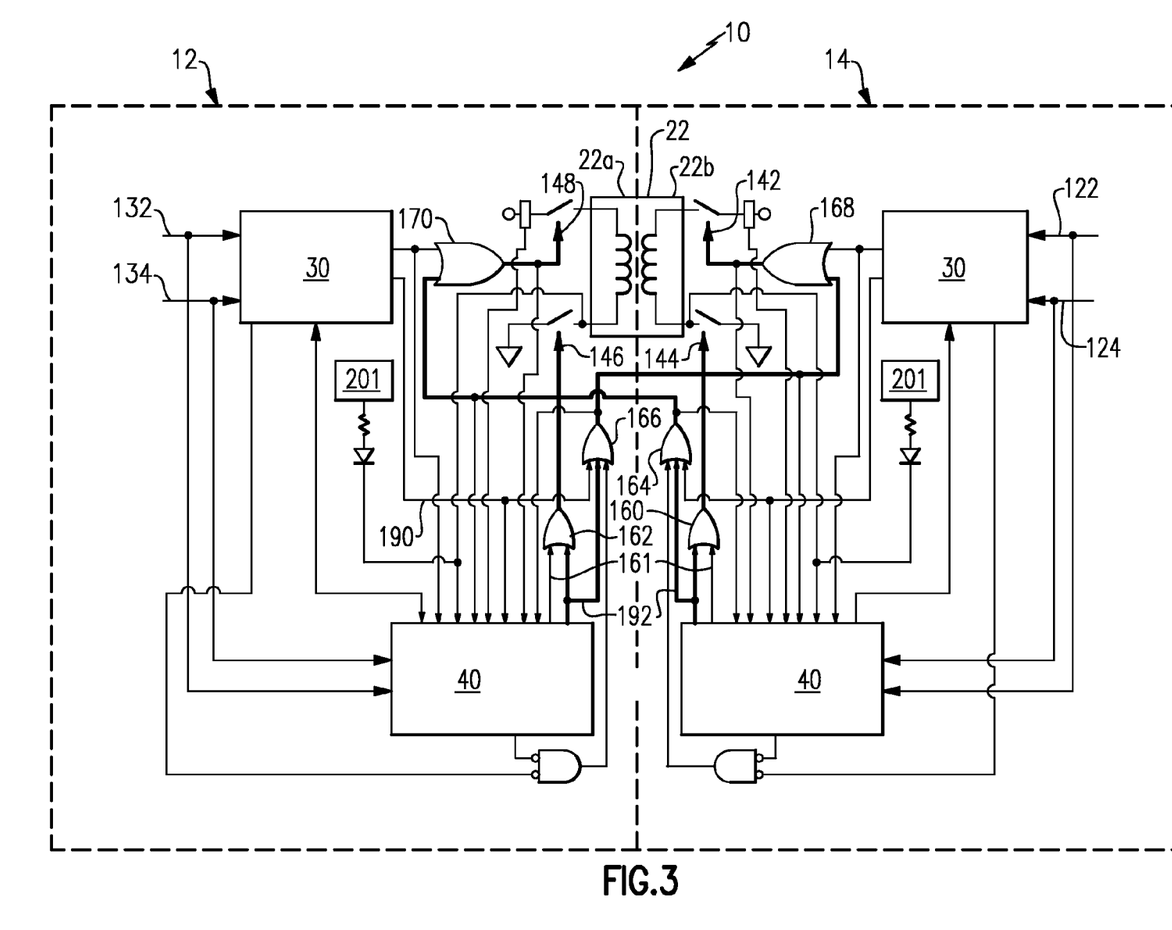
FIG. 3 illustrates the primary operation mode of the example of FIG. 2.

FIG. 3 illustrates the primary operation protection mode of the multi-channel controller 10 with all four of the controllers 30, 40 being healthy. In FIG. 3, each of the protection devices 40 detects an overspeed condition based on the sensor inputs 122, 124,132, 134 and outputs an overspeed detected signal 192 to the backup OR gates 160, 162, causing the backup OR gates 160, 162 to output an overspeed detected signal to the protection device inputs 144, 146.

The overspeed detected input 192 is also sent to the alternate OR gates 164, 166. Since each of the alternate OR gates 164, 166 has at least one signal indicating that the overspeed solenoid 22 should be activated, the alternate OR gates 164, 166 each also output a high signal indicating that the overspeed solenoid 22 should be activated. The outputs of the alternate OR gates 164, 166 are received by the primary OR gates 168, 170, causing the primary OR gates 168, 170 to output a signal activating the overspeed solenoid 22 to the overspeed solenoid inputs 148, 142.

Thus, when all four controllers 30, 40 are operating and healthy and an overspeed condition is detected, the overspeed solenoid receives an input signal at two inputs 142, 144, 146, 148 at each of the channels 22a, 22b instructing activation of the overspeed solenoid 22.

While it is desirable that all four of the controllers 30, 40 are operating, and therefore at least two of the four controllers 30, 40 detect any event, it is understood that during standard operation, controllers can fail. The below descriptions illustrate how the system can continue functioning in a number of failure modes.

Figure 4:
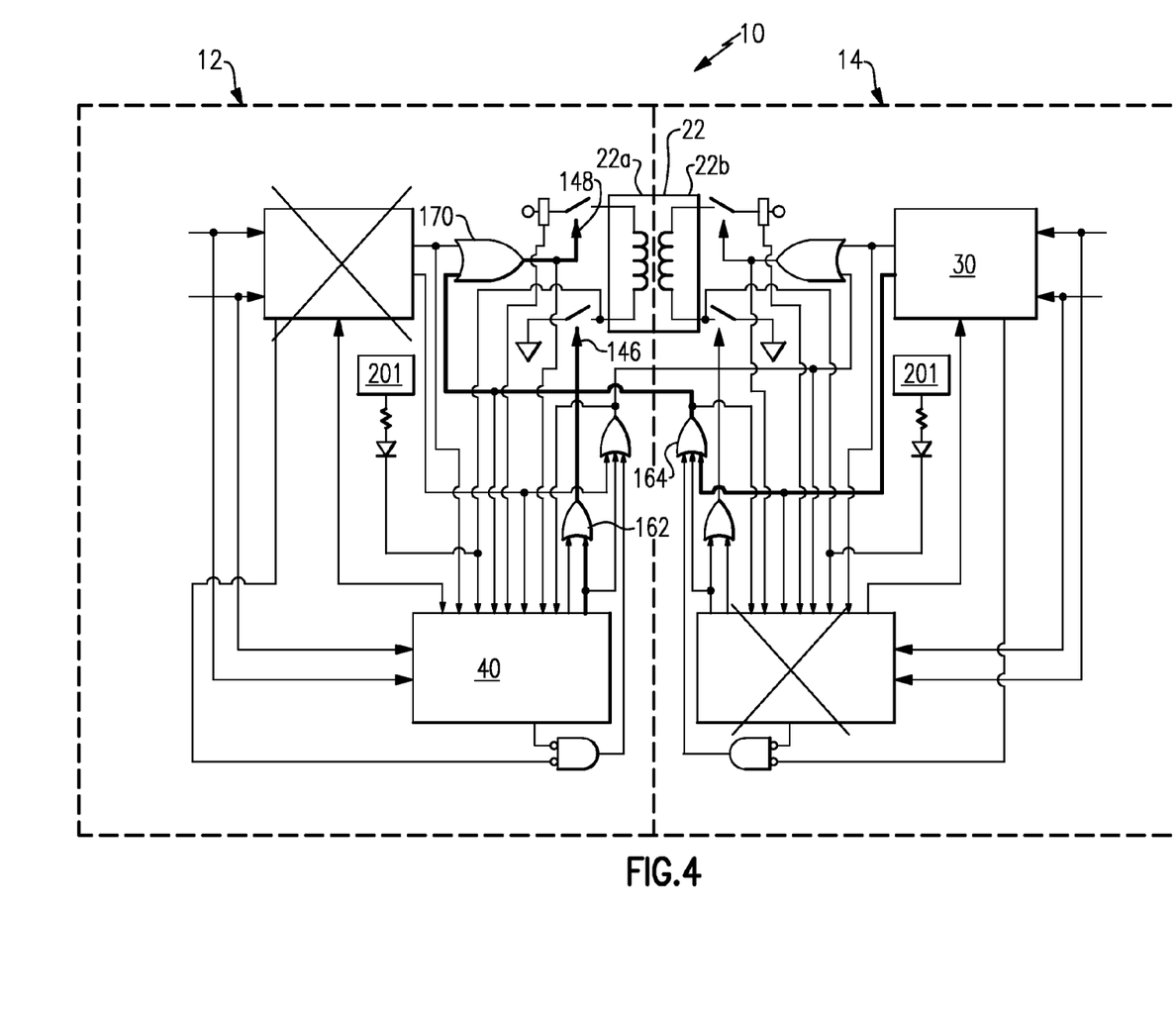
FIG. 4 illustrates a first example failure mode of the example of FIG. 2.

FIG. 4 illustrates an alternate operation mode of the multi-channel controller 10 with all four of the controllers 30, 40 being healthy. Additionally, the operational mode of FIG. 4 functions when the primary controller 30 in one channel 12 and/or the protection device 40 in the other channel 14 are unhealthy (non-functional). In FIG. 4, the primary controller 30 that is healthy outputs an overspeed detected signal to the alternate OR gate 164 corresponding to the healthy primary controller 30. The alternate OR gate 164 then outputs an overspeed detected signal to the primary OR gate 170 corresponding to the opposite channel 12 having an unhealthy primary controller 30, causing the primary OR gate 170 to output an overspeed detected signal to the overspeed solenoid input 148.

Likewise, the protection device 40 that is healthy outputs an overspeed detected signal 192 to the backup OR gate 162 in the channel 12 corresponding to the healthy protection device 40. The backup OR gate 162 outputs an overspeed detected signal to the backup overspeed solenoid 22 input 146, thus ensuring that both inputs in a single channel 22a of the overspeed solenoid 22 receive an activation input in response to the detection of an overspeed event. The overspeed solenoid 22 is fully operational as long as a single channel 22a is operational, the primary overspeed solenoid input 148 and the backup overspeed solenoid input 146 are sufficient to activate the overspeed solenoid 22.

Figure 5:
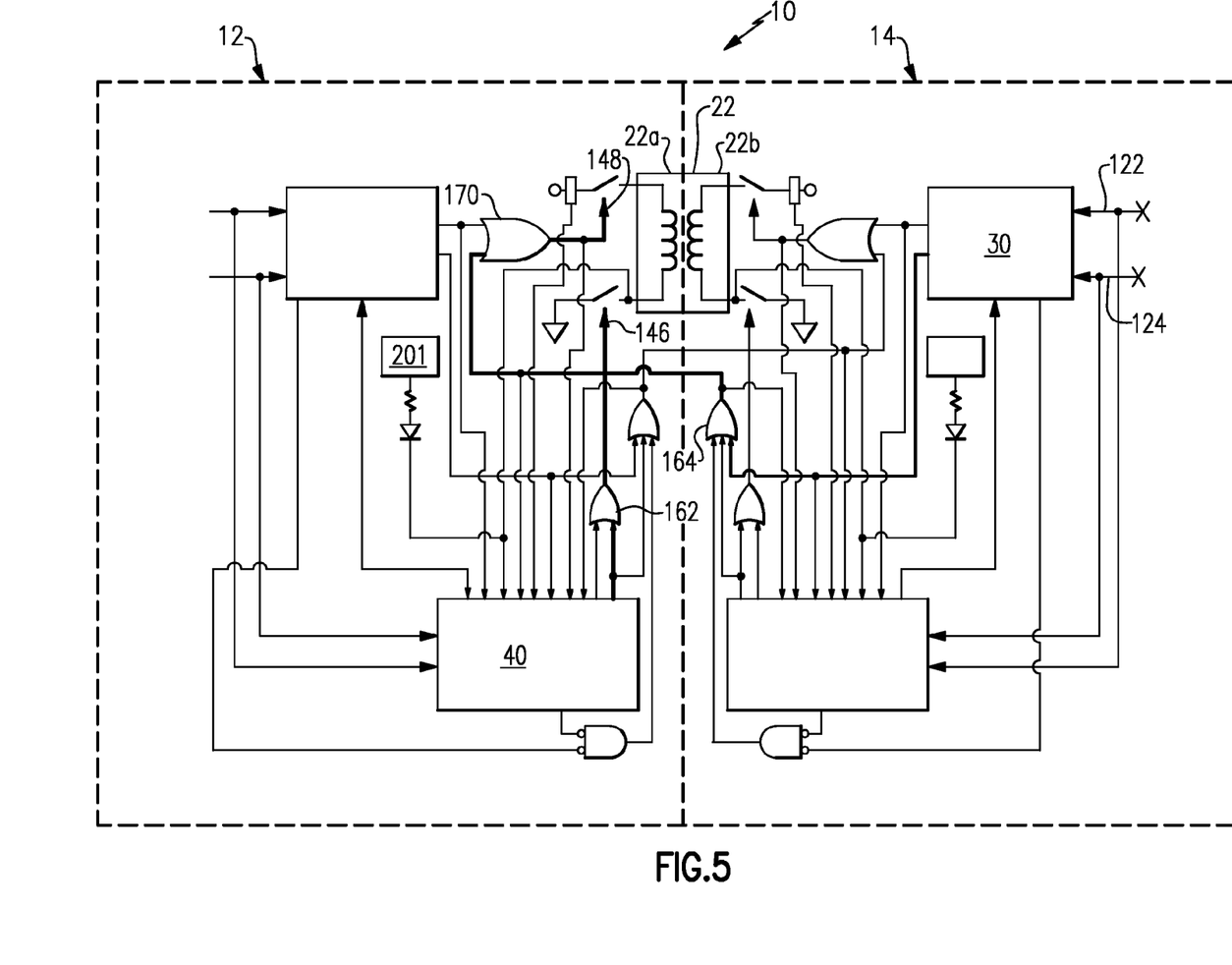
FIG. 5 illustrates a second example failure mode of the example of FIG. 2.

FIG. 5 illustrates an alternate operation mode of the multi-channel controller 10 where both speed sensors for one of the channels 14 ceases operating. When both speed sensor inputs 122, 124 cease operating, and the primary controller 30 is healthy, the primary controller 30 assumes an overspeed condition in order to force a failsafe mode. The primary controller 30 of the channel 14 with the failed speed sensors outputs an overspeed detected signal to the alternate OR gate 164 corresponding to the channel 14 with the failed speed sensor. Since at least one of the alternate OR gate's 164 inputs indicates an overspeed condition, the alternate OR gate 164 outputs an overspeed detected signal to the primary OR gate 170 in the opposite control channel 12. The primary OR gate 170 then continuously outputs an overspeed detected signal to the overspeed solenoid 22 via the primary overspeed solenoid input 148 as long as the speed sensor is in a failure state.

The protection device 40 in the channel 12 corresponding to the healthy speed sensor only outputs an overspeed detected signal when an actual overspeed event is detected. The overspeed detected signal is output to the backup OR gate 162, which then outputs an overspeed detected signal to the overspeed solenoid 22 input 146. Once two overspeed detected signals are received at a single channel 22a of the overspeed solenoid 22, the overspeed solenoid 22 activates, and the overspeed event is protected against. In this failure mode, the overspeed solenoid 22 receives two overspeed detected signals to a single channel 12, 14 when an overspeed condition exists, despite the overspeed sensors being dead to the other channel 12, 14.

Figure 6:
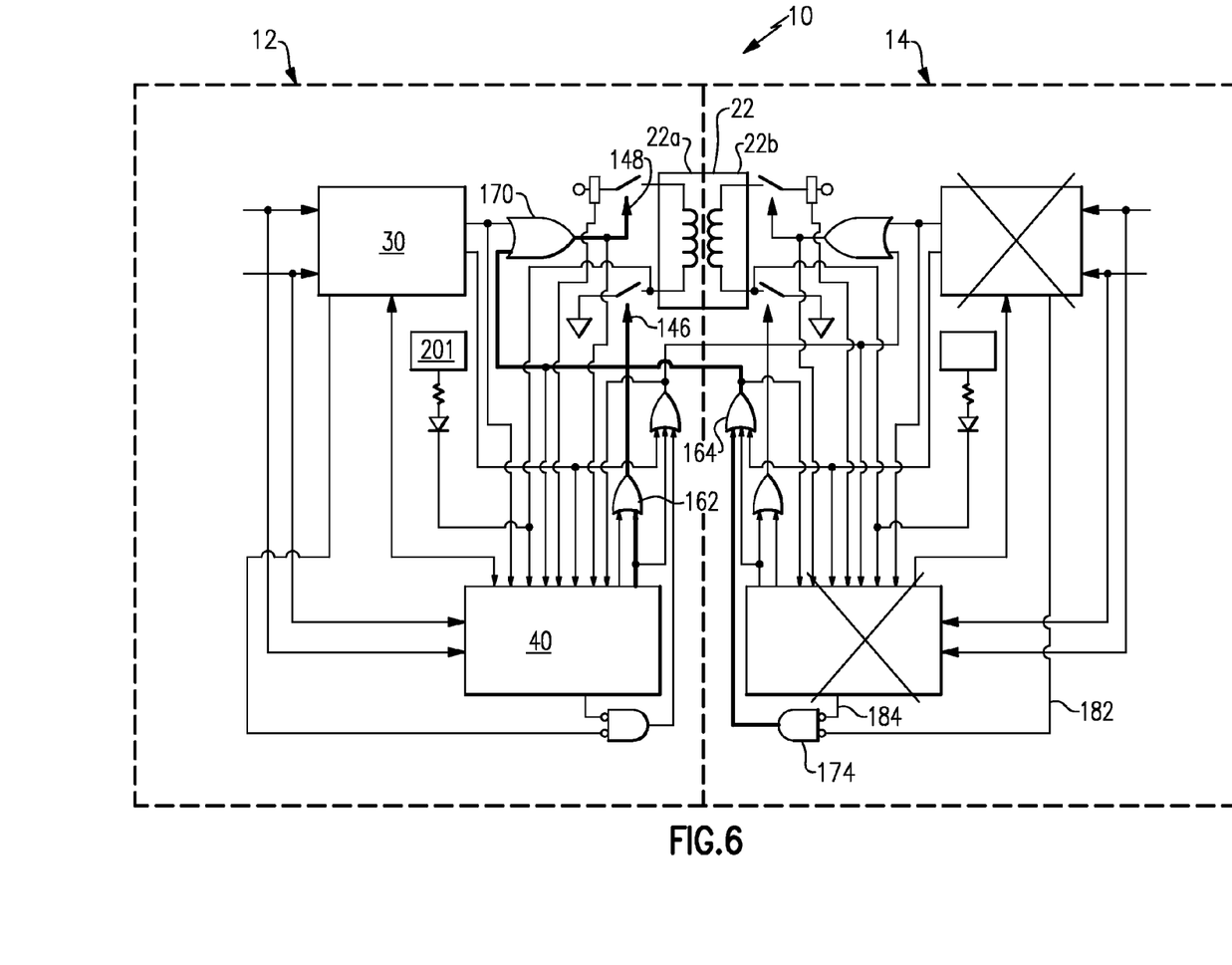
FIG. 6 illustrates a third example failure mode of the example of FIG. 2.

FIG. 6 illustrates an alternate mode of operation of the multi-channel stepper motor controller 10 where one control channel 14 enters a dual failure mode and entirely ceases operation. When the channel 14 enters failure mode, both the primary controller health input 182 and protection device health input 184 to the channel health control AND gate 174 cease indicating that the corresponding controller 30, 40 is healthy. Both of the inputs to the channel health control AND gate 174 are inverted, and the AND gate sees two positive signals and outputs an overspeed detected signal to the alternate OR gate 164 corresponding to the failed channel 14. The overspeed detected signal is the default signal for a failure channel 12, 14.

As the alternate OR gate 164 has at least one input indicating an overspeed condition, the alternate OR gate 164 outputs a signal indicating an overspeed condition to the primary OR gate 170 corresponding to the currently healthy control channel 12. The primary OR gate 170 then outputs an overspeed detected signal to the overspeed solenoid 22 input 148. As with the example of FIG. 5, the overspeed solenoid 22 only activates when both the primary input 148 and the backup input 146 of a single channel 22a indicate an overspeed condition.

When the protection device 40 in the functional channel 12 detects an overspeed condition, the protection device 40 outputs an overspeed detected signal to the corresponding backup OR gate 162. The backup OR gate 162 then outputs an overspeed detected signal to the backup overspeed detected input 146 of the overspeed solenoid 22, thus providing both needed inputs 146, 148 to activate the overspeed solenoid 22 in the case of an overspeed event.

Figure 7:
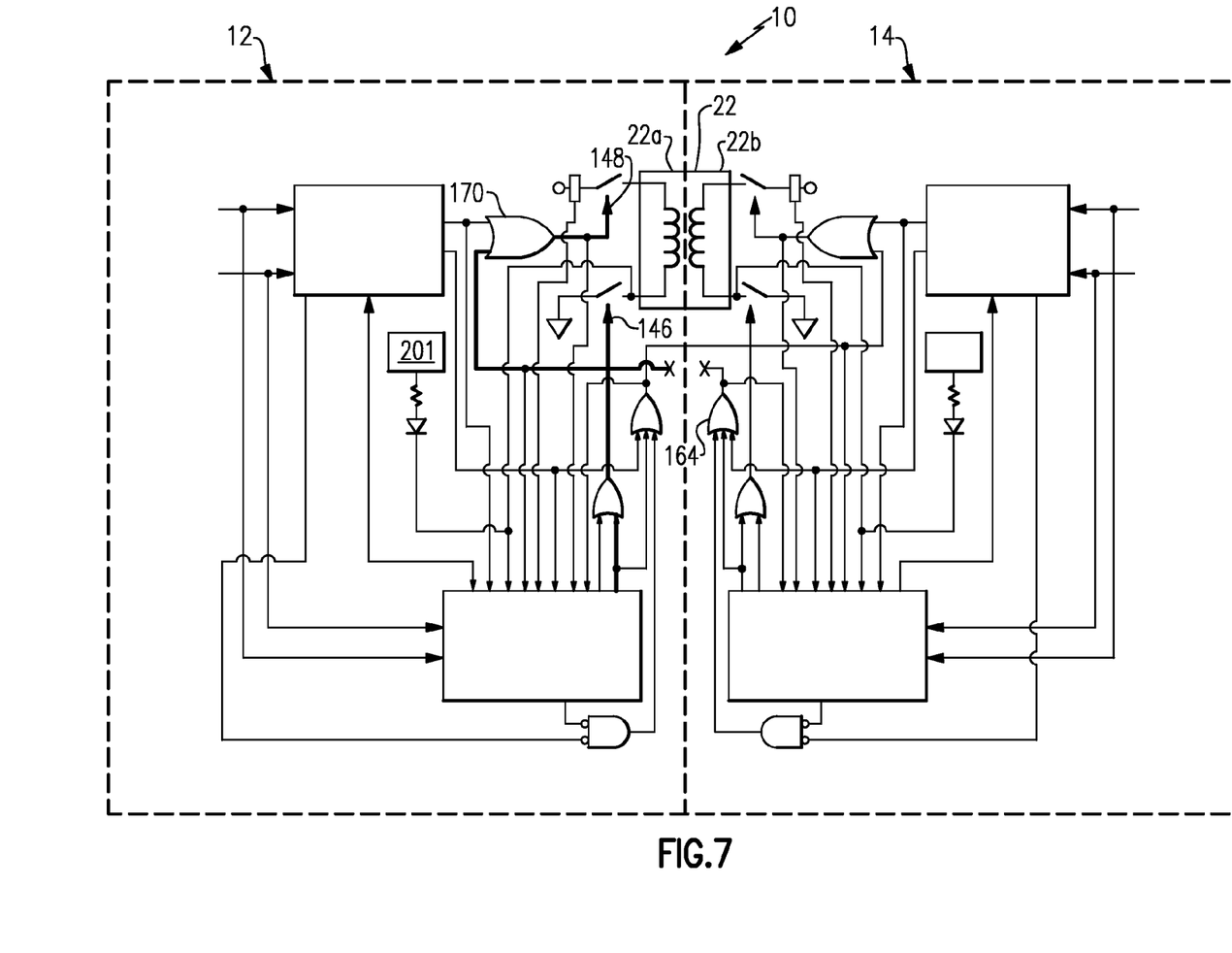
FIG. 7 illustrates a fourth example failure mode of the example of FIG. 2.

An alternate failure mode to one of the controllers 30, 40 or one of the control channels 12, 14 failing is that cross-channel overspeed vote signal between the two channels 12, 14 is disrupted due to a severed electrical connection. FIG. 7 illustrates an example where the communication between one of the control channels 14 is severed from the other control channel 12. As can be seen in FIG. 7, the link between alternate OR gate 164 corresponding to control channel 14 and the primary OR gate 170 is severed. The primary OR gate 170 is configured such that when the link to the input corresponding to the alternate OR gate 164 of the opposite control channel 14 is severed, the input defaults to an overspeed detected input, thus causing the primary OR gate 170 to output an overspeed detected signal to the primary overspeed protection solenoid input 148.

Similarly, if power is lost to one channel 14 causing a gross failure in that channel, then the primary OR gate 170's input in channel 12 from channel 14's alternate OR gate 164 defaults to an overspeed event.

The input for the protection device input 146 to the overspeed solenoid 22 is provided in an identical fashion as was previously described with regards to the dual or gross failure mode example of FIG. 6. Thus, at least one channel receives the two inputs 146, 148 needed to activate the overspeed solenoid 22.

As can be seen in the illustrations of FIGS. 4-7, the failure modes in each example Figure are symmetrical, with opposite failures from the ones described resulting in the same functionality.

Although an example of this invention has been disclosed, a worker of ordinary skill in this art would recognize that certain modifications would come within the scope of this invention. For that reason, the following claims should be studied to determine the true scope and content of this invention.

The invention claimed is:

1. A multi-channel controller comprising:
a first control channel having a first primary controller with a first primary control output signal and a first protection device with a first protection device output signal without sharing a microprocessor bus with the first primary control;
a second control channel having a second primary controller with a second primary control output signal and a second protection device with a second protection device output signal without sharing a microprocessor bus with the second primary control; and
a plurality of logic gates connecting each of said first primary control output signal, said first protection device output signal, said second primary control output signal, and said second protection device output signal to a controlled device;
wherein said plurality of logic gates comprises at least a first primary OR gate and a second primary OR gate;
wherein said first primary OR gate combines a first primary control output signal and a second alternate output control signal representative of at least one of the second primary control signal, a second protection device signal and a health of the second control channel;
wherein said second primary OR gate combines a second primary control output signal and a first alternate output control signal representative of at least one of the first primary control signal, the first protection device signal and a health of the first control channel; and
wherein said first primary OR gate outputs a control signal to a controlled device and said second primary OR gate outputs a control signal to the controlled device.

2. The multi-channel controller of claim 1, wherein said first primary control output signal, said first protection device output signal, said second primary control output signal, and said second protection device output signal are overspeed detected signals.

3. The multi-channel controller of claim 1, wherein the controlled device is a multi-channel solenoid having a first channel and a second channel and wherein either of said channels is individually sufficient to actuate said multi-channel solenoid.

4. The multi-channel controller of claim 1, wherein said first control channel comprises an alternate OR gate having an input of a first primary control output signal, a first protection device output signal and a first channel health signal, and wherein said alternate OR gate outputs an event detected signal to said second primary OR gate.

5. The multi-channel controller of claim 1, wherein said first channel comprises a channel health control AND gate having a first input corresponding to a first primary controller health and a second input corresponding to a first protection device health.

6. The multi-channel controller of claim 1, wherein said first control channel and said second control channel are symmetrical.

7. The multi-channel controller of claim 1, wherein said plurality of logic gates comprises a solid state logic circuit.

8. The multi-channel controller of claim 1, where the protection device comprises a combination of solid state logic circuits and software in a microprocessor independent of the primary controller.

9. The multi-channel controller of claim 1, wherein said controller is configured such that a multi-channel controller remains operable to detect an event when a fault occurs within at least one of a primary controller and a protection device that does not share a microprocessor bus with the primary controller, and wherein said multi-channel controller is configured such that a false event detection is prevented in an otherwise healthy system.

10. The multi-channel controller of claim 1, further comprising a plurality of self-test signal monitors connecting each of said first and second protection device with at least one of an input through a high side switch, an input through a low side switch, an output of a local overspeed vote signal, an output of a remote overspeed vote signal, and a plurality of outputs of one of said first and second primary controller.

* * * * *